(12) United States Patent
Kaiho et al.

(10) Patent No.: US 6,340,853 B1
(45) Date of Patent: Jan. 22, 2002

(54) ELECTRIC ROTATING MACHINE

(75) Inventors: Masayuki Kaiho; Hideaki Mori, both of Chiyoda; Shigekazu Kieda, Ishioka; Ryoichi Shiobara, Hitachi; Kenichi Hattori, Hitachi; Akiyoshi Komura, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/665,170

(22) Filed: Sep. 19, 2000

(30) Foreign Application Priority Data

Mar. 13, 2000 (JP) .............................. 12-073905

(51) Int. Cl.⁷ .............................. H02K 9/00; H02K 1/32
(52) U.S. Cl. ...................................... 310/61; 310/60 A
(58) Field of Search ............................ 310/61, 55, 54, 310/52, 60 R, 58, 60 A

(56) References Cited

U.S. PATENT DOCUMENTS

| | | | | |
|---|---|---|---|---|
| 3,030,530 A | * | 4/1962 | Tudge | 310/55 |
| 3,225,231 A | * | 12/1965 | Kudlacik | 310/64 |
| 3,997,803 A | * | 12/1976 | Mishra | 310/59 |

* cited by examiner

*Primary Examiner*—Nestor Ramirez
*Assistant Examiner*—Guillermo Perez
(74) *Attorney, Agent, or Firm*—Antonelli, Terry, Stout & Kraus, LLP

(57) ABSTRACT

Efficient ventilation and cooling for a rotor is realized at a low cost by reducing the pressure loss at inlet flow passages, which lead to axial flow passages through which cooling gas flows to the rotor. Inlet flow passages leading to axial flow passages for cooling an interior of the rotor are composed of convex portions, which are formed axially on surfaces of a rotor spindle between and below coil ends of the rotor, and concave grooves formed between the convex portions. Also, the convex portions are designed to have a height increasing toward a downstream side, and assuming that L designates an length of the convex portions, L is greater than a radial difference between the positions of a maximum radius and a minimum radius of the convex portions.

9 Claims, 7 Drawing Sheets

ELECTRIC ROTATING MACHINE

BACKGROUND OF THE INVENTION

The invention relates to an electric rotating machine for turbine generators or the like, and, more particularly, to the cooling construction of a rotor for the electric rotating machine.

In electric rotating machines, ventilation and cooling for a rotor therein are effected by a construction in which axial flow passages are provided in the rotor to permit a cooling gas to flow through the rotor. With such a construction, the pressure loss becomes exceedingly great since the flow passages are rapidly reduced in area at the inlet portions thereof, through which a cooling gas flows into the axial flow passages. Accordingly, reduction of the pressure loss at the inlet portions of the axial flow passages becomes important in providing high efficiency cooling in the rotor. Japanese Patent Laid-Open No. 150898/1999 describes a method of reducing the pressure loss at inlet portions of such axial flow passages. With such an arrangement, rounding R is applied directly to corners it the inlet portions of the axial flow passages or rounding R is applied to the edges of guide plates or spacing pieces provided between axial flow passages. Thereby, separation in the flow is reduced at the inlet portions of the axial flow passages, so that the pressure loss can be reduced at the inlet portions.

The prior approach described above offers the following problems.

A first problem is the magnitude of the effect in reduction of the pressure loss. In the case of rounding R being applied directly to the inlets of the axial flow passages, a large rounding R actually applied cannot be so large because to do so it is necessary to increase the circumferential width of the rotor iron core to some extent at the inlets of the axial flow passages from the point of view of strength. Also, in the case of rounding R being applied to guide plates or spacing pieces, a rounding R larger than a circumferential spacing of the axial flow passages cannot be applied, in particular, in an electric rotating machine having a large capacity, in which the circumferential spacing of the axial flow passages is small. Therefore, any great effect in reduction of pressure loss cannot be expected because it is not possible to decrease the rate of change in the flow passage area in a flow direction.

A second problem is related to cost. In the case of the rounding R being applied directly to inlets of the axial flow passages, a processing is necessary for applying rounding R to each of the multiplicity of inlets of the axial flow passages provided circumferentially, which involves an increased cost for processing. In the case of the rounding R being applied to guide plates or-spacing pieces, the material cost and processing cost will be correspondingly increased.

SUMMARY OF THE INVENTION

It is an object of the present invention to provide an electric rotating machine which has a construction for cooling the a rotor thereof, and which is low in cost and is greatly effective in reduction of the pressure loss.

To attain the above-mentioned object, the invention has a first feature which resides in an electric rotating machine having axial flow passages for cooling an interior of a rotor, in which inlet flow passages leading to the axial flow passages are composed of convex portions formed on surfaces of a rotor spindle between and below the rotor coil ends, and concave grooves are formed between the convex portions, and the convex portions are tapered to have a height increasing toward a downstream side.

More preferably, the axial length L of the convex portions is greater than the radial difference between the positions of a maximum radius R2 and a minimum radius R1 of the convex portions.

Bottom surfaces of the concave grooves are effectively tapered to have a height increasing toward the downstream side.

Further, a minimum radius portion of the inlet flow passages leading to the axial flow passages may have a diameter smaller than that of a minimum radius portion inside the axial flow passages.

The invention has a second feature which resides in an electric rotating machine having axial flow passages for cooling an interior of a rotor, the machine comprising inlet flow passages leading to the axial flow passages, and wherein the inlet flow passages gently decrease in flow passage area in an axial direction so that points of inflection are not produced on a curve connecting flow velocity distributions in a widthwise direction of the flow passages at portions immediately after inflowing into the axial flow passages.

The invention has a third feature which resides in an electric rotating machine comprising axial flow passages for cooling an interior of a rotor, wherein a minimum radius R4, of upstream side portions of the axial flow passages are smaller than a minimum radius R3 of an interior of the axial flow passages on a downstream side thereof. Thus, the pressure loss can be reduced because a substantial area of the flow passages, at portions immediately after the inflow of cooling gas into the axial flow passages, can be made large.

The invention has a fourth feature which resides in an electric rotating machine having axial flow passages for cooling an interior of a rotor, the machine comprising inlet flow passages leading to the axial flow passages and composed of flow passage forming members formed on surfaces of a rotor spindle between and below rotor coil ends, and concave flow passages formed between the flow passage forming members, the flow passage forming members being tapered to have a height increasing toward a downstream side.

Hereupon, spacing pieces may be provided between the rotor coil ends, and the flow passage forming members may be constructed to be integral with the spacing pieces.

DESCRIPTION OF THE PREFERRED EMBODIMENTS

Figure 1:
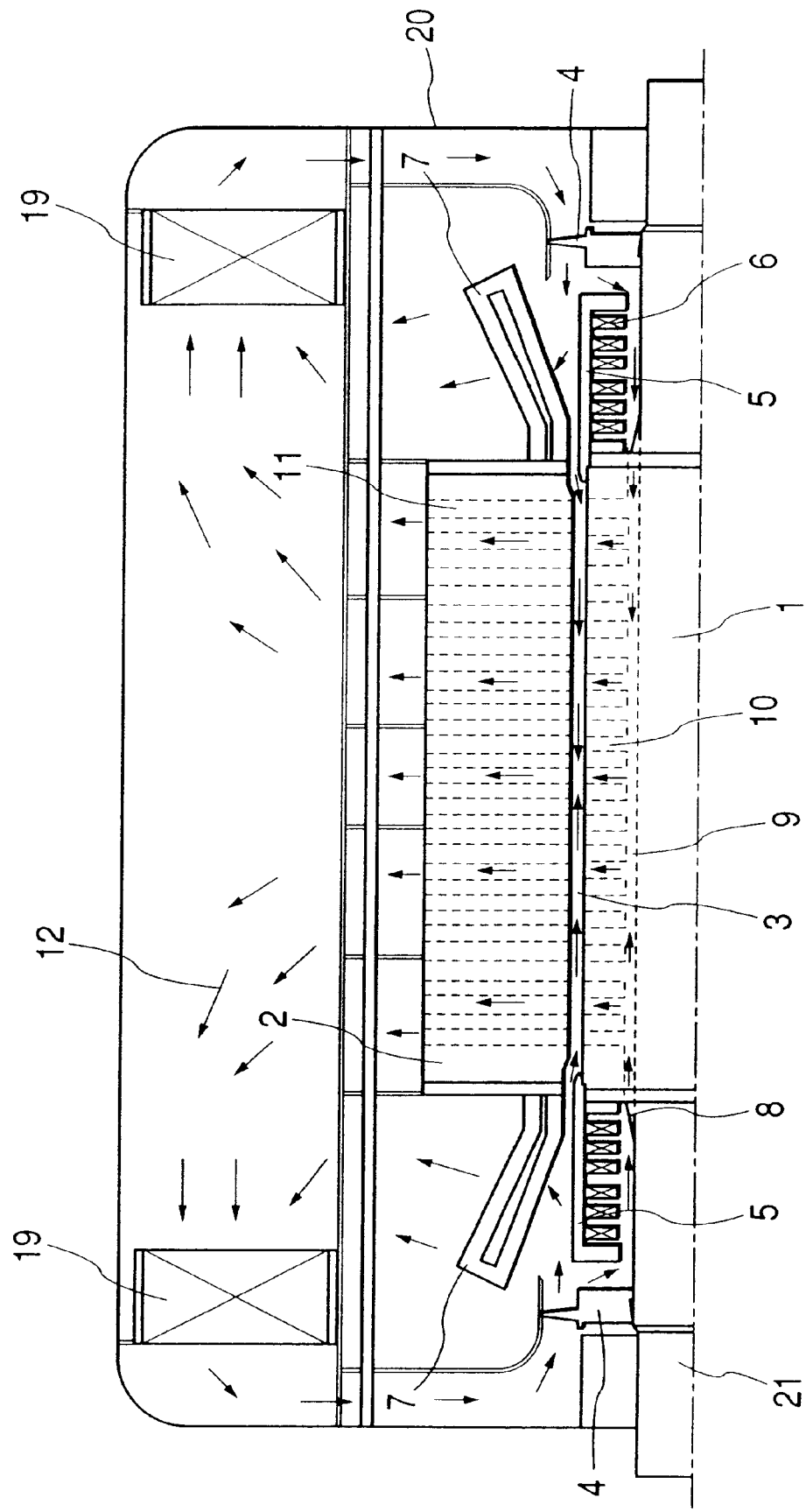
FIG. 1 is a longitudinal, cross sectional view schematically showing an electric rotating machine according to a first embodiment of the invention.
Figure 2:
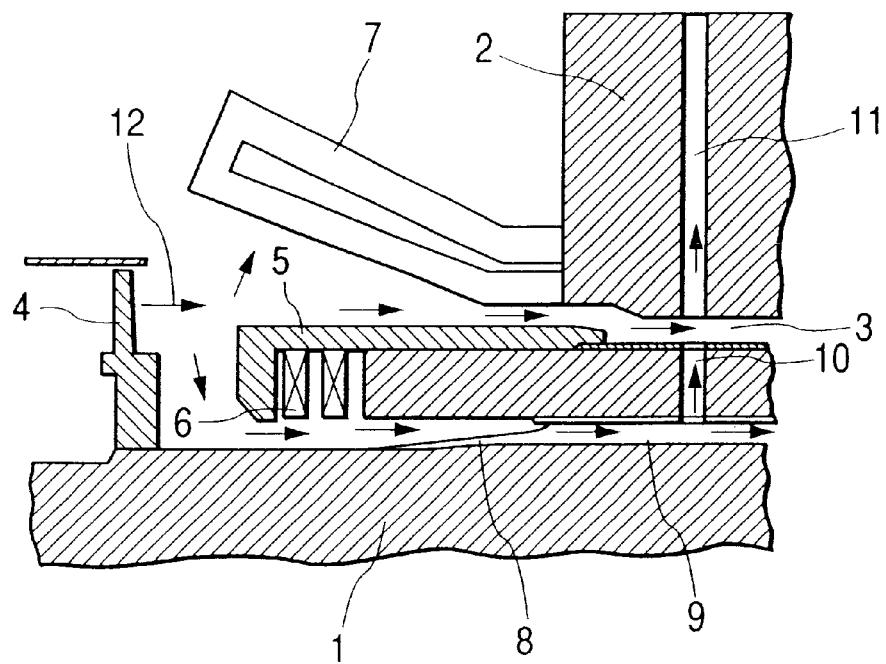
FIG. 2 is a cross sectional view showing, on an enlarged scale, an essential part of an inlet of an axial flow passage in the electric rotating machine shown in FIG. 1.

A first embodiment of the invention will be described with reference to FIGS. 1 to 6. FIG. 1 is a longitudinal, cross sectional view schematically showing the construction of an electric rotating machine according to a first embodiment of the invention. FIG. 2 is a cross sectional view showing, on an enlarged scale, a part of the construction of the electric rotating machine shown in FIG. 1, and showing the construction of the electric rotating machine and the gas flow therein.

With the electric rotating machine of the embodiment, a rotor 1 mounted on a rotating shaft 21 in a vessel 20 rotates inside a stator 2 with rotation of the rotating shaft 21. Also, rotation of the rotating shaft 21 causes rotation of fans 4 to generate gas flows in the vessel 20, which gas flows cool respective parts of the electric rotating machine .

Gas (hereinafter referred to as a cooling gas) flows generated by rotation of the fans 4 comprise first gas flows, which pass neither inside the rotor 1, nor inside the stator 2, but pass around stator coil ends 7, to cool the same, and then pass through air coolers 19 so as to be cooled before they return to the fans 4, and second gas flows, which pass inside the rotor i and the stator 2 to cool the same, and which then merge with the first gas flows, that have not passed through either the rotor 1 or the stator 2. The combined gas flows then pass through the air coolers 19 back to the fans 4.

The gas flows passing through the rotor 1 and the stator 2 comprise gas flows which pass through gaps between retaining rings (holding rings) 5 and the stator coil ends 7 so as to pass into an air gap 3, and gas flows which flow through gaps between rotor coil ends 6 held by the retaining rings 5 and the rotor 1. The latter gas flows pass through axial flow passages 9, which are provided on the rotor 1 to permit a cooling gas to flow inside the rotor 1 and on paths which extend axially of the rotating shaft 21, and through radial ducts 10 so as to flow in the air gap 3 to merge with the gas flows which have passed directly into the air gap 3. After merging, the combined gas flow passes through stator cooling flow passages 11 while cooling the stator 2. Also, parts of the gas flows conducted toward the gaps between the retaining rings 5 and the stator coil ends 7 from the fans 14 are not directed to the air gap 3, but are passed through the stator coil ends 7 to cool the same. In addition, the reference numeral 8 designates inlet flow passages leading to the axial flow passages 9, and the construction thereof will be described later with reference to FIGS. 3 and 4.

Figure 3:
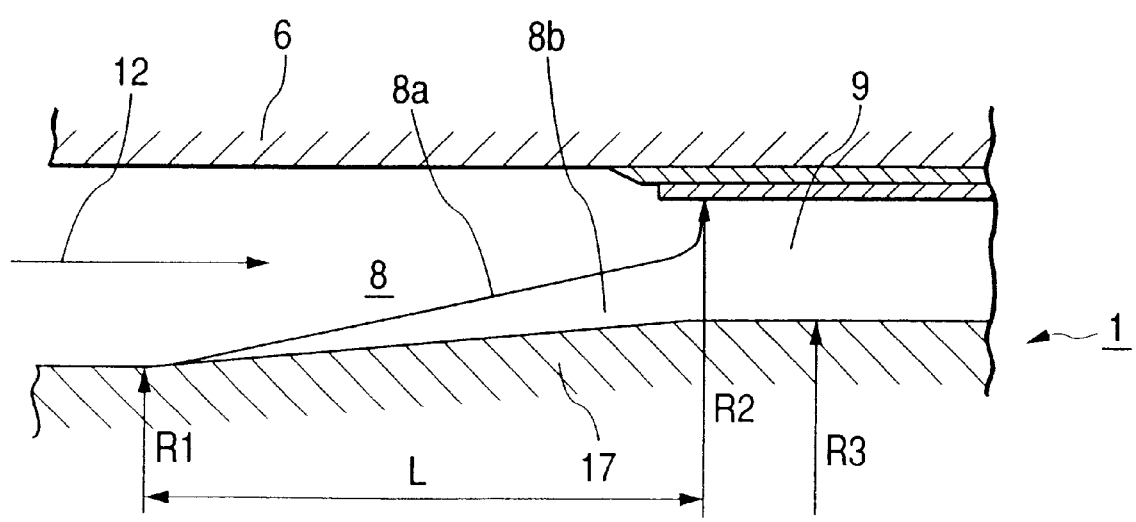
FIG. 3 is a longitudinal cross sectional view showing, on an enlarged scale, a part of the electric rotating machine shown in FIG. 1.
Figure 4:
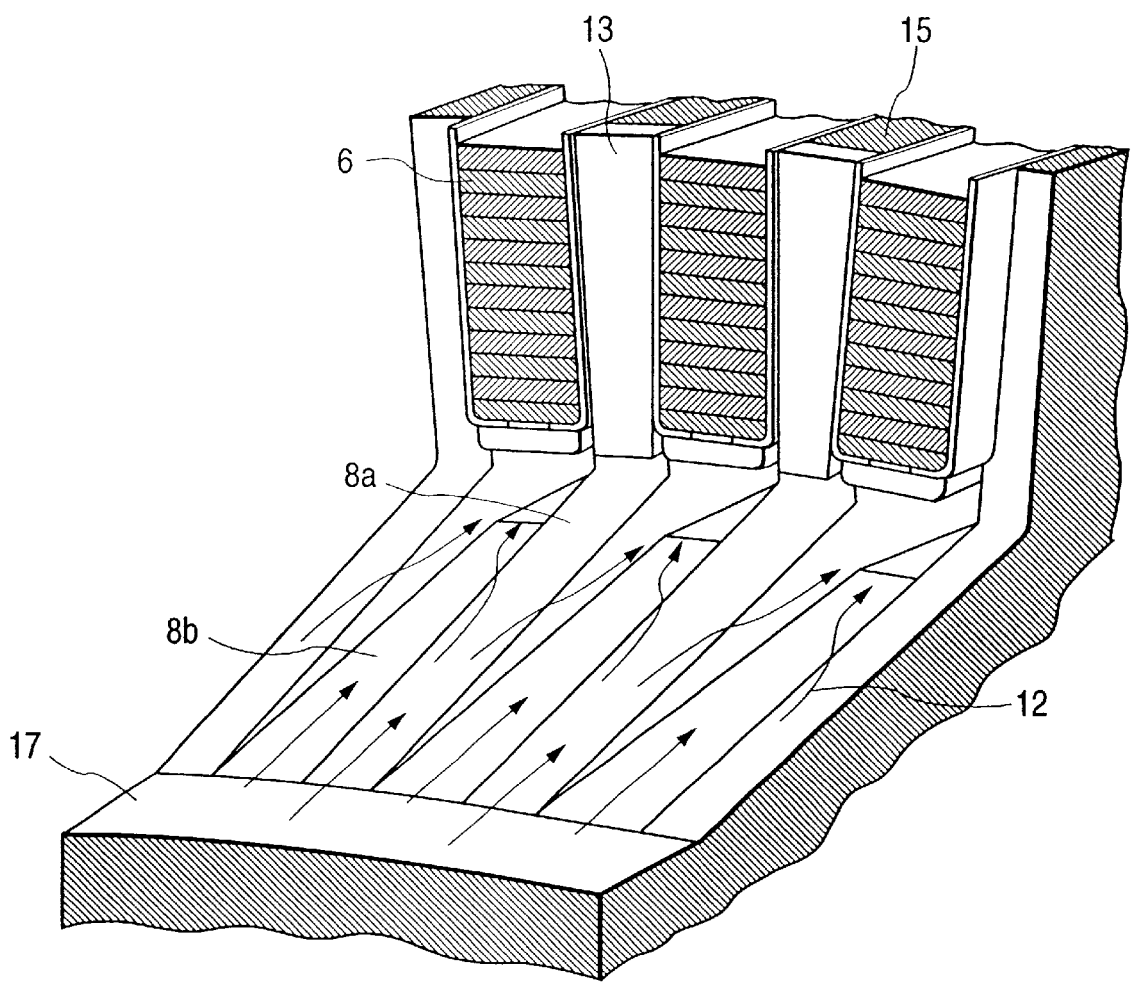
FIG. 4 is a perspective view showing, on an enlarged scale, an essential part of the inlet of the axial flow passage shown in FIG. 2.

FIG. 3 is a cross sectional view showing the inlet flow passage 8 leading to the axial flow passage 9, as well as the rotating shaft of the rotor. FIG. 4 is a perspective view showing portions of the inlet flow passages 8 leading to the axial flow passages 9. As shown in these figures, the inlet flow passages 8 leading to the axial flow passages 9 are composed of convex portions 8a axially formed on the surface of a rotor spindle 17 below the rotor coil ends 6 and of concave portions 8b formed between the convex portions 8a, which are tapered so as to be increased in height toward a downstream side in the direction of gas flow. Also, the axial length L of the tapered convex portions is designed to be adequately larger than a radial difference (R2−R1) between a maximum radius R2 of and a minimum radius R1 of the convex portions. Also, the minimum radius R1 of the inlet flow passages 8 leading to the axial flow passages 9 is designed to be smaller than a minimum radius R3 inside the axial flow passages 9.

In addition, the inlet flow passages 8 leading to the axial flow passages may be composed of (a) flow passage forming members which are separate from the spindle 17 and are arranged axially on the surface of the rotor spindle 17 below the rotor coil ends 6, so as to have the same function as that of the above convex portions 8a, and (b) concave flow passages formed between the flow passage forming members. The flow passage forming members are tapered so as to be increased in height toward downstream sides in the direction of gas flow. Further, spacing pieces 13 may be provided between the rotor coil ends so as to be made integral with the flow passage forming members.

Figure 5:
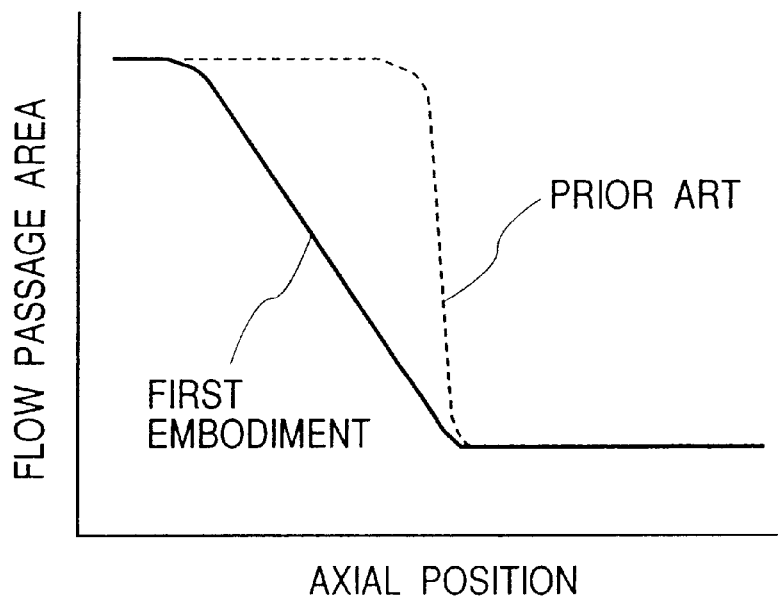
FIG. 5 is a graphic diagram showing a rate of change in flow passage area of the inlet flow passage leading to the axial flow passage, in a direction of flow by comparison between the first embodiment of the invention and the prior art.
Figure 6:
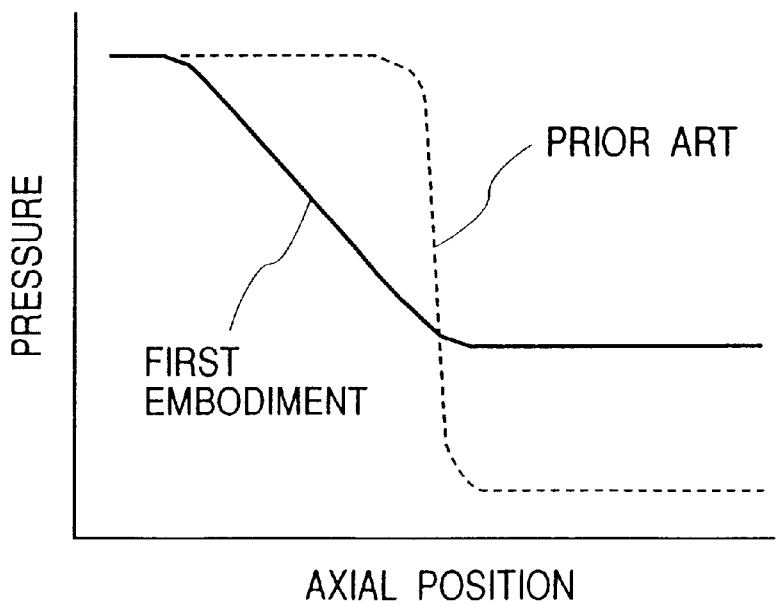
FIG. 6 is a graphic diagram showing pressure distributions in the inlet flow passage leading to the axial flow passage, in the direction of flow by comparison between the first embodiment of the invention and the prior art.

FIG. 5 is a graphic view comparatively showing a change of an area of the inlet flow passage 8 in an axial direction for the first embodiment of the invention and the prior art. FIG. 6 is a graphic view comparatively showing a pressure distribution in the inlet flow passage 8 in the axial direction for the first embodiment of the invention and the prior art. The inlet flow passages 8 leading to the axial flow passages are configured in a manner as shown in FIGS. 3 and 4, whereby the embodiment provides a smaller rate of change of flow area in an axial direction, that is, in the gas flow direction, than the prior art, as apparent from the gradients for the embodiment shown by a solid line and for the prior art shown by a broken line in FIG. 5. Correspondingly, as shown in FIG. 6, the invention can be made significantly smaller than the prior art with respect to the amounts of change in pressure in the flow direction (axial direction), so that the pressure loss can be reduced substantially. Also, according to the embodiment, processing the spindle surfaces of the rotor 1 in the above-mentioned manner can be realized only by somewhat modifying a program of NC processing, which does not entail a surplus material cost and adds little machining cost, so that the manufacture can be effected more advantageously than the prior art in terms of cost.

Figure 7:
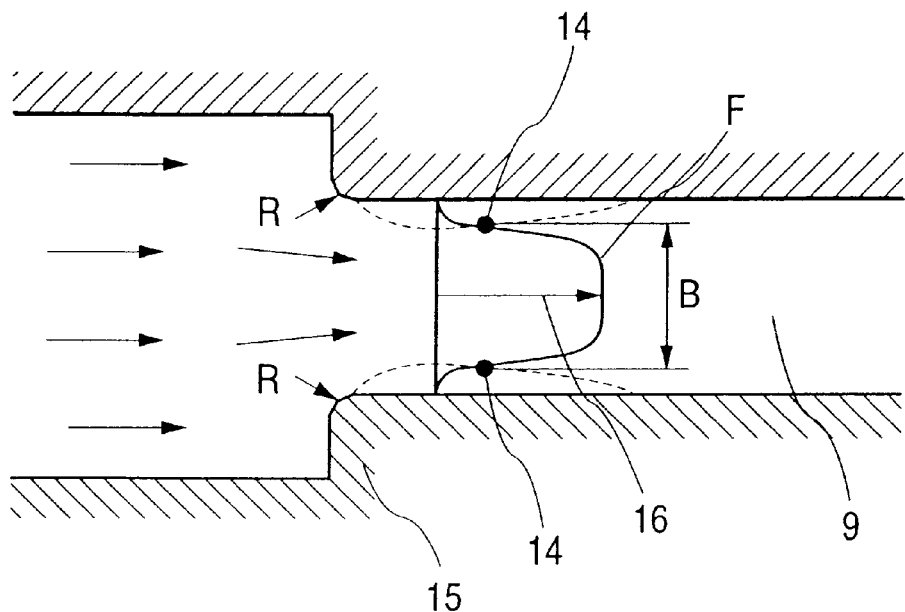
FIG. 7 is a longitudinal cross-sectional view which illustrates changes in passage area for the inlet flow passage and the axial flow passage in the prior art in a two-dimensional manner.
Figure 8:
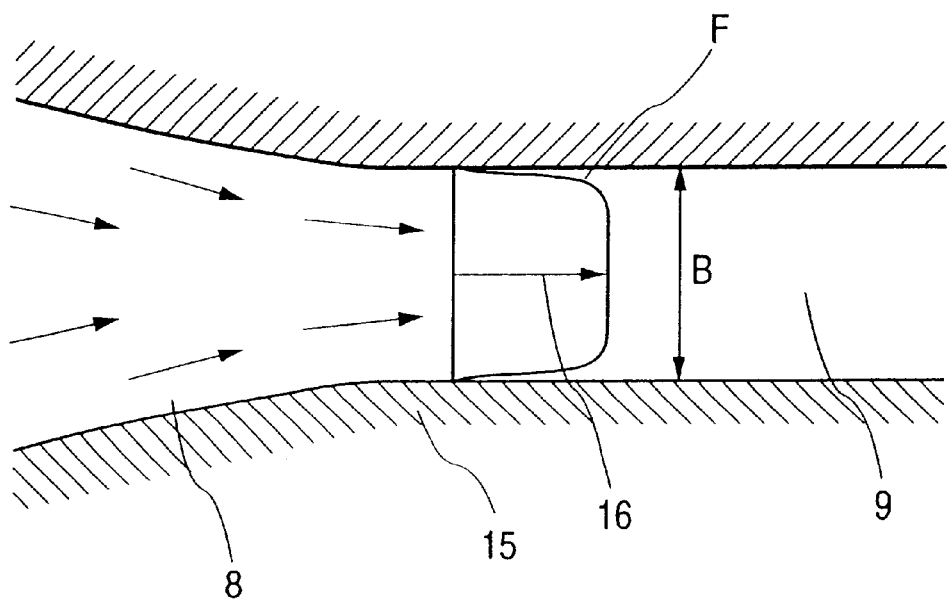
FIG. 8 is a longitudinal cross-sectional view which illustrates changes in passage area for the inlet flow passage and the axial flow passage in the first embodiment of the invention in a two-dimensional manner.

FIGS. 7 and 8, respectively, illustrate changes in passage area for the inlet flow passage 8 and the axial flow passage 9 in a two-dimensional manner, FIG. 7 showing the case of the prior art and FIG. 8 showing the case of the first embodiment of the invention.

With the prior art, the rounding R at corners of an inlet is effective in eliminating flow separation as shown in FIG. 7, while the flow velocity distribution in a widthwise direction of the flow passage immediately after inflowing into the axial flow passages 9 includes, as shown by a curve F, a region near the wall surface of the flow passage where the flow velocity is small, and points of inflection 14 are present in the flow velocity curve distribution F. Accordingly, a distance B between the points of inflection 14 corresponds substantially to the width of the flow passage, with the result that the flow passage substantially undergoes contraction. Therefore, the maximum flow velocity 16 at an area of contraction becomes large, and the pressure loss correspondingly becomes great. In addition, in the case where the rounding R is not provided at the corners of the inlets, a flow separation will be generated, whereby the distance B between the points of inflection becomes even small, so as to cause a great pressure loss.

In contrast, according to the invention, the area of the inlet flow passage 8 decreases gradually, whereby a flow velocity distribution is obtained in which the curve F of flow velocity distribution in a widthwise direction of the flow passage immediately after inflowing into the axial flow passage 9 lacks any points of inflection. Accordingly, the substantial flow passage width B becomes substantially equal to the actual width, so that the maximum flow velocity 16 at an area where contraction has conventionally been generated can be made smaller than that in the prior art, and so it becomes possible to greatly reduce the pressure loss.

Figure 9:
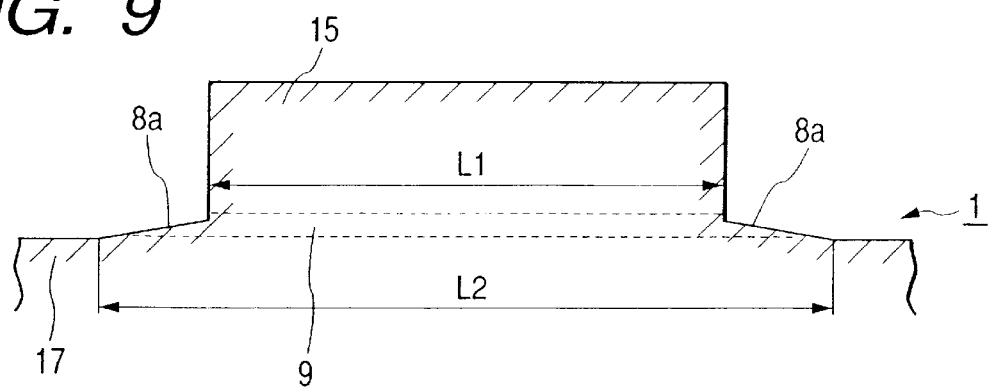
FIG. 9 is a longitudinal cross sectional view of a rotor in the first embodiment of the invention.

FIG. 9 is a cross sectional view showing a rotor (including a portion of the rotating shaft of the rotor) and an iron core of the rotor in the first embodiment of the invention. Assuming that Li designates an axial width of that portion of the iron core 15 of the rotor on which a coil is present, and L2 designates the width of a root portion, L2 has been made substantially equal to L1 in the prior art. In contrast, L2 is substantially greater than Li in the embodiment of the invention, since the convex portions 8a are formed thereon. Because a great centrifugal force acts on the iron core 15 of the rotor, the width L2 of the root portion greatly affects the strength of the iron core 15 of the rotor. However, the strength of the iron core 15 of the rotor can be enhanced in the embodiment of the invention, since the width L2 of the root portion is large.

Figure 10:
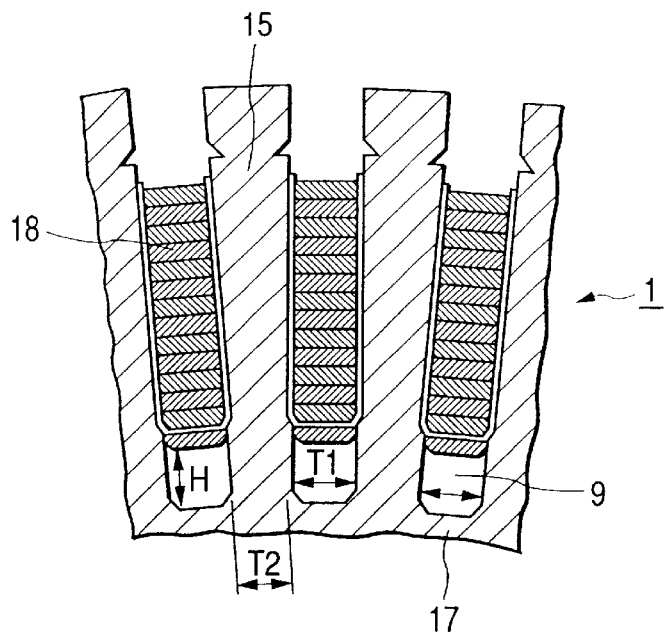
FIG. 10 is a side, cross sectional view showing an essential part of an iron core of the rotor in the first embodiment of the invention.

FIG. 10 is a view showing a cross section (side cross section) of the iron core 15 of the rotor 1 perpendicular to the rotating shaft. Generally, the width T1 of the axial flow passages 9 is not varied in a radial direction, and the circumferential width T2 of the iron core 15 of the rotor becomes in many cases smaller as the associated radius becomes small, and so it becomes minimum at the root. According to the embodiment of the invention, the larger the width L2 of the root portion of the iron core 15 of the rotor for enhancement of strength, the larger the height H of the axial flow passages 9 shown in FIG. 9 can become, and the smaller the circumferential width T2 of the root portion of the iron core can become, so that it becomes possible to decrease the average flow velocity inside the axial flow passage 9, so that there is produced an effect in reducing pressure loss in an inlet portion of the axial flow passages 9 and in the flow passages themselves. Also, instead of increasing the height H of the axial flow passages 9, the, width T1 of the axial flow passages 9 is made large so as to decrease the average flow velocity inside the axial flow passages 9, thereby decreasing the pressure loss.

A second embodiment of the invention will be described below with reference to FIGS. 11 to 13.

Figure 11:
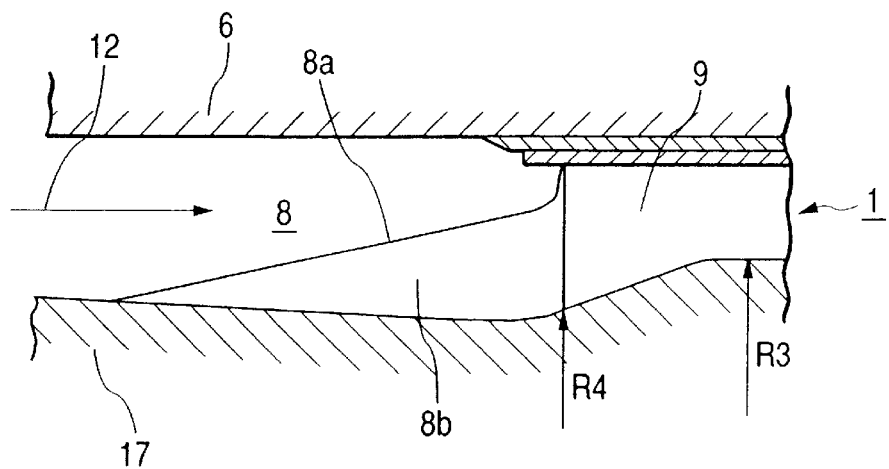
FIG. 11 is a cross sectional view showing, on an enlarged scale, an essential part of an inlet of an axial flow passage in a second embodiment of the invention, corresponding to FIG. 3.

FIG. 11 is a cross sectional view (view corresponding to FIG. 3) including an axis of rotation of the rotor, showing portions of the axial flow passages 9 and of the inlet flow passages 8 in a second embodiment of the invention. In this embodiment, a minimum radius R4 of upstream side portions of the axial flow passages 9 (most downstream side portions of the inlet flow passages 8) is set to be smaller than a minimum radius R3 of further downstream side portions of the axial flow passages 9. The second embodiment is the same in other respects as the first embodiment shown in FIGS. 1 to 3.

Figure 12:
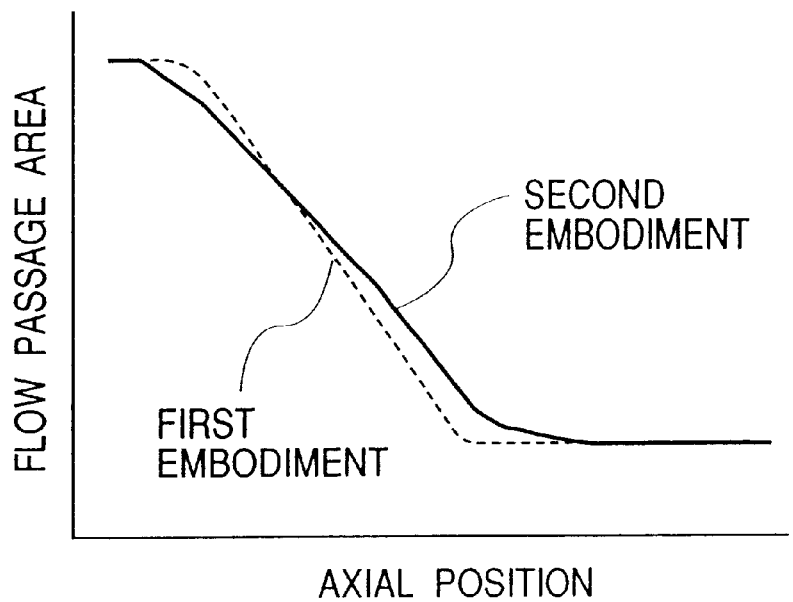
FIG. 12 is a graphic diagram showing a rate of change in flow passage area of the inlet flow passage leading to the axial flow passage, in a direction of flow by comparison between the first and second embodiments of the invention.
Figure 13:
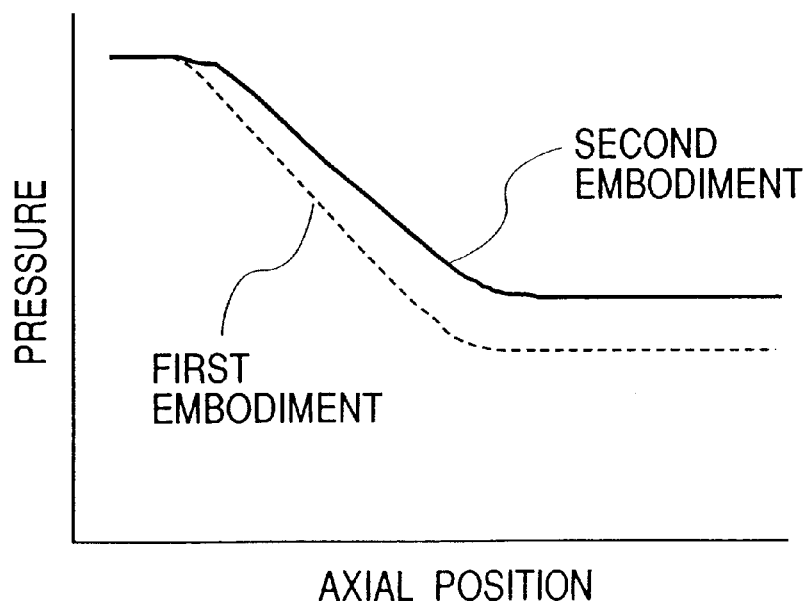
FIG. 13 is a graphic diagram showing pressure distributions in the inlet flow passage leading to the axial flow passage, in the direction of flow by comparison between the first and second embodiment of the invention.

FIG. 12 is a view comparatively showing changes in flow passage area of the inlet flow passages 8 leading to the axial flow passages, in the axial direction with respect to the first and second embodiments of the invention, and FIG. 13 is a view comparatively showing pressure distributions (total pressure) in the inlet flow passages 8 in the axial direction with respect to the first and second embodiments. With the arrangement of the second embodiment, the rate of change in the flow passage area in the axial direction (flow direction) can be made even smaller than that in the first embodiment. Therefore, with the second embodiment, the substantial flow passage width B shown in FIG. 8 can be made nearer to the actual flow passage width than that in the first embodiment, and so it is effective in further enabling a decrease in the pressure loss relative to that in the first embodiment. Also, like the first embodiment, the manufacture of the construction according to the second embodiment can be realized only by somewhat modifying a program of NC processing, so that the manufacturing cost can be suppressed lower than that of the prior art.

In addition, the configuration of the inlet flow passages 8 leading to the axial flow passages in the second embodiment may be constituted by other flow passage forming members formed integral with the spacing pieces 13 (see FIG. 4) and concave flow passages formed between the flow passage forming members as well as by processing the surfaces of the rotor spindle 17.

Further, pressure loss can be further reduced in the first and second embodiments when rounding (a corner is rounded so as to have a configuration changing smoothly) is applied on portions where inlet corners of the axial flow passages 9 are formed.

The electric rotating machine according to the present invention is constructed such that the inlet flow passages, which provide inlets for the flow of a cooling gas to the rotor, are composed of tapered convex portions and concave grooves, whereby the rate of change in an area of the inlet flow passages in the axial direction is made small. Accordingly, it is possible according to the present invention to obtain an electric rotating machine in which pressure loss can be reduced at the inlets of the axial flow passages and which has a cooling construction of a rotor having a great effect in reduction of pressure loss.

Also, manufacture in accordance with the invention can be implemented easily at low cost because manufacture can be performed simply by somewhat modifying a program of NC processing, or the like.

What is claimed is:

1. An electric rotating machine having axial flow passages for cooling an interior of a rotor, characterized in that inlet flow passages provided at opposite ends of said rotor and leading to said axial flow passages are composed of convex portions formed on surfaces of a rotor spindle between and below rotor coil ends and concave grooves formed between the convex portions, and said convex portions are tapered to have a height increasing toward a downstream side.

2. The electric rotating machine according to claim 1, wherein an axial length L of said convex portions is greater than a radial difference between positions of a maximum radius R2 and a minimum radius R1 of the convex portions.

3. The electric rotating machine according to claim 2, wherein bottom surfaces of the concave grooves are tapered to have a height increasing toward the downstream side.

4. The electric rotating machine according to any one of claims 1 to 3, wherein minimum radius portions of the inlet flow passages leading to the axial flow passages have a diameter smaller than that of minimum radius portions inside the axial flow passages.

5. The electric rotating machine according to claim 1, wherein bottom surfaces of the concave grooves are tapered to have a height increasing toward the downstream side.

6. An electric rotating machine having axial flow passages for cooling of an interior a rotor, said machine comprising inlet flow passages provided at opposite ends of said rotor and leading to said axial flow passages, characterized in that said inlet flow passages gently decrease in flow passage area in an axial direction so that points of inflection are not produced on a curve connecting flow velocity distributions in a widthwise direction of the flow passages at portions immediately after inflowing into said axial flow passages.

7. An electric rotating machine comprising axial flow passages extending from opposite ends of a rotor for cooling an interior of said rotor, characterized in that a minimum radius of upstream side portions of said axial flow passages is smaller than a minimum radius of interiors of said axial flow passages on a downstream side thereof.

8. An electric rotating machine having axial flow passages for cooling an interior of a rotor, characterized in that inlet flow passages provided at opposite ends of said rotor and leading to said axial flow passages are composed of flow passage forming members formed on surfaces of a rotor spindle between and below rotor coil ends and concave flow passages formed between the flow passage forming members, and said flow passage forming members are tapered to have a height increasing toward a downstream side.

9. The electric rotating machine according to claim 8, further comprising spacing pieces provided between the rotor coil ends, wherein said flow passage forming members being constructed to be integral with said spacing pieces.

* * * * *